US012688732B2

(12) United States Patent
Hale et al.

(10) Patent No.: US 12,688,732 B2
(45) Date of Patent: Jul. 21, 2026

(54) PROVIDING ASSISTANCE BASED ON MACHINE LEARNING MODEL ANALYSIS OF VIDEO DATA

(71) Applicant: Disney Enterprises, Inc., Burbank, CA (US)

(72) Inventors: Gregory Brooks Hale, Orlando, FL (US); Gary D. Markowitz, San Juan Capistrano, CA (US); Clifford Aron Wilkinson, Clermont, FL (US); Ching-Chien Chen, Arcadia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 98 days.

(21) Appl. No.: 18/506,124

(22) Filed: Nov. 9, 2023

(65) Prior Publication Data

US 2024/0153312 A1     May 9, 2024

Related U.S. Application Data

(63) Continuation-in-part of application No. 17/901,687, filed on Sep. 1, 2022, which is a continuation of
(Continued)

(51) Int. Cl.
*G06V 40/20*          (2022.01)
*G06V 10/82*          (2022.01)
(Continued)

(52) U.S. Cl.
CPC ............. *G06V 40/20* (2022.01); *G06V 20/41* (2022.01); *G06V 40/10* (2022.01); *G06V 40/1365* (2022.01); *G09B 19/003* (2013.01)

(58) Field of Classification Search
None
See application file for complete search history.

(56) References Cited

U.S. PATENT DOCUMENTS 6,133,838 A * 10/2000 Meniere ............... G08B 21/082
                                                                    340/573.6
10,086,262 B1    10/2018  Capper et al.
(Continued)

FOREIGN PATENT DOCUMENTS

CN        110210323 A  *  9/2019  ......... G06K 9/00362
KR     20240071833 A  *  5/2024  ............... H04N 7/18
(Continued)

OTHER PUBLICATIONS

Hoshen, et al., "Egocentric Video Biometrics," retrieved from https://arxiv.org/abs/1411.7591v1, 9 pages (2014).
(Continued)

*Primary Examiner* — Hung Q Dang
(74) *Attorney, Agent, or Firm* — Foley & Lardner LLP

(57)          ABSTRACT

A guest assistance platform may analyze video data of an environment that includes a liquid substance. The video data is analyzed using a machine learning model trained to detect objects in the liquid substance. The guest assistance platform may detect an individual in the liquid substance based on analyzing the video data and may determine a measure of confidence associated with detecting the individual in the liquid substance. The guest assistance platform may determine one or more confidence factors associated with detecting the individual in the liquid substance. The guest assistance platform may modify the measure of confidence using the one or more confidence factors and may determine whether the modified measure of confidence satisfies a confidence threshold. The guest assistance platform may selectively cause assistance to be provided to the individual or continue analyzing the video data based on whether the modified measure of confidence satisfies the confidence threshold.

17 Claims, 9 Drawing Sheets

Related U.S. Application Data application No. 16/531,930, filed on Aug. 5, 2019, now Pat. No. 11,450,145, which is a continuation-in-part of application No. 15/485,896, filed on Apr. 12, 2017, now Pat. No. 10,417,896.

(51) Int. Cl.

| | | |
|---|---|---|
| *G06V 20/40* | (2022.01) | |
| *G06V 20/52* | (2022.01) | |
| *G06V 40/10* | (2022.01) | |
| *G06V 40/12* | (2022.01) | |
| *G08B 21/04* | (2006.01) | |
| *G09B 19/00* | (2006.01) | |

(56) References Cited

U.S. PATENT DOCUMENTS

| | | | |
|---|---|---|---|
| 2010/0210975 | A1 | 8/2010 | Anthony et al. |
| 2011/0098109 | A1 | 4/2011 | Leake et al. |
| 2014/0327548 | A1* | 11/2014 | Maisonnier ........ G01N 33/1886 |
| | | | 340/603 |
| 2015/0213244 | A1 | 7/2015 | Lymberopoulos et al. |
| 2017/0278051 | A1 | 9/2017 | Cohn |
| 2018/0040223 | A1* | 2/2018 | Bodi ...................... G08B 21/18 |
| 2021/0194718 | A1* | 6/2021 | Scalisi ................... H04N 7/186 |
| 2021/0241597 | A1* | 8/2021 | Gali ....................... G10L 17/22 |
| 2022/0343650 | A1* | 10/2022 | Konakalla ............. G06V 20/52 |
| 2023/0394355 | A1* | 12/2023 | Bruce ................... G06N 20/00 |
| 2024/0378893 | A1 | 11/2024 | Han |

FOREIGN PATENT DOCUMENTS

| | | | | |
|---|---|---|---|---|
| WO | WO-02097758 | A1 * | 12/2002 | .......... G08B 21/082 |
| WO | WO-2012145800 | A1 * | 11/2012 | ........... G08B 21/08 |
| WO | WO-2017130187 | A1 * | 8/2017 | .............. G06N 3/08 |

OTHER PUBLICATIONS

Kearns, et al., "Temporo-spacial prompting for persons with cognitive impairment using smart wrist-worn interface," Journal of Rehabilitation Research and Development 50(10), pp. vii-xiii (2013).

\* cited by examiner

100

Environment

Liquid substance

Article of clothing and tool

150
Detect that an individual has fallen into the liquid substance

Machine learning model
115

Response engine
120

Guest assistance platform
110

155
Determine a measure of confidence associated with detecting that the individual has fallen into the liquid substance

100

160
Determine one or more confidence factors associated with detecting that the individual has fallen Guest
assistance
platform
110

Machine
learning model
115

Response
engine
120

165
Modify the measure of confidence based on the one or more confidence factors

100

Guest assistance platform 110

Machine learning model 115

Response engine 120

170
Determine whether the modified measure of confidence satisfies a confidence threshold 175
Determine that assistance is to be provided to the individual

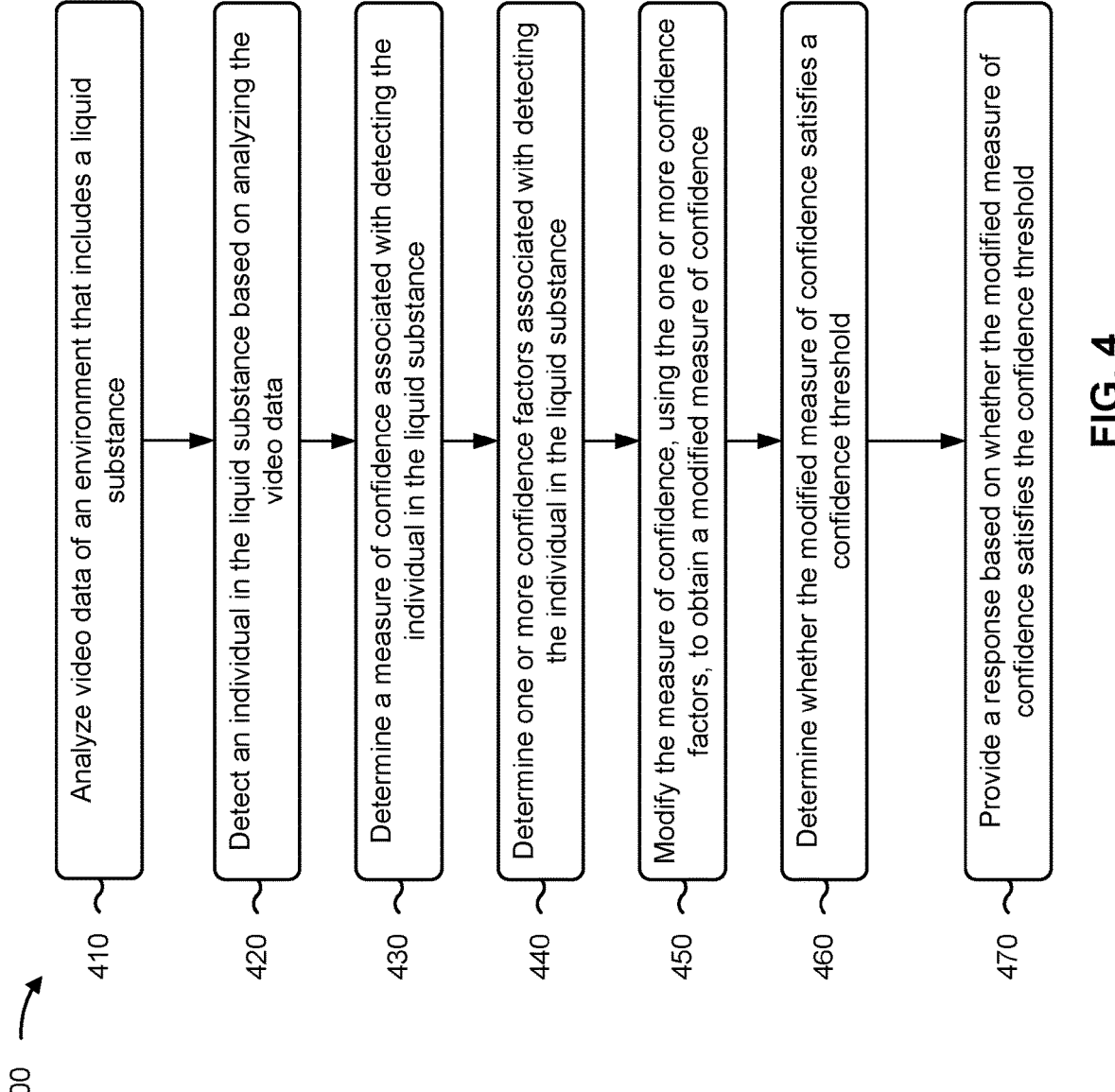

400

410 — Analyze video data of an environment that includes a liquid substance

420 — Detect an individual in the liquid substance based on analyzing the video data 430 — Determine a measure of confidence associated with detecting the individual in the liquid substance 440 — Determine one or more confidence factors associated with detecting the individual in the liquid substance 450 — Modify the measure of confidence, using the one or more confidence factors, to obtain a modified measure of confidence 460 — Determine whether the modified measure of confidence satisfies a confidence threshold 470 — Provide a response based on whether the modified measure of confidence satisfies the confidence threshold

FIG. 4

PROVIDING ASSISTANCE BASED ON MACHINE LEARNING MODEL ANALYSIS OF VIDEO DATA

RELATED APPLICATIONS

This application is a continuation-in-part of U.S. patent application Ser. No. 17/901,687, filed Sep. 1, 2022, which is a continuation of U.S. patent application Ser. No. 16/531, 930, filed Aug. 5, 2019, now U.S. Pat. No. 11,450,145, which is a continuation-in-part of U.S. patent application Ser. No. 15/485,896, filed Apr. 12, 2017, now U.S. Pat. No. 10,417,896, which are all incorporated herein by reference in their entireties.

BACKGROUND

Closed-circuit television (CCTV) is a system that includes video camera devices that provide signals (e.g., video feeds) to specified monitors located at a specified location. In this regard, a CCTV system differs from a broadcast television system that broadcasts signals to multiple monitors located at multiple locations. A CCTV system is typically used to perform surveillance of areas monitored by the video camera devices.

SUMMARY

In some implementations, a method performed by a guest assistance platform includes analyzing video data of an environment that includes a liquid substance, wherein the video data is analyzed using a machine learning model trained to detect objects in the liquid substance; detecting an individual in the liquid substance based on analyzing the video data; determining a measure of confidence associated with detecting the individual in the liquid substance; determining one or more confidence factors associated with detecting the individual in the liquid substance; modifying the measure of confidence, using the one or more confidence factors, to obtain a modified measure of confidence; determining whether the modified measure of confidence satisfies a confidence threshold; and selectively causing assistance to be provided to the individual or continue analyzing the video data based on whether the modified measure of confidence satisfies the confidence threshold, wherein the assistance is provided based on the modified measure of confidence satisfying the confidence threshold, and wherein the video data is analyzed based on the modified measure of confidence not satisfying the confidence threshold.

In some implementations, a device includes one or more memories; and one or more processors, coupled to the one or more memories, configured to: analyze video data of a liquid substance, wherein the video data is analyzed using a machine learning model trained to detect objects that have fallen into the liquid substance; detect, based on analyzing the video data, that an individual has fallen into the liquid substance; determine a measure of confidence associated with detecting the individual has fallen into the liquid substance; determine one or more confidence factors associated with the measure of confidence; modify the measure of confidence, using the one or more confidence factors, to obtain a modified measure of confidence; perform a first action when the modified measure of confidence is a first value; and perform a second action when the modified measure of confidence is a second value different than the first value, wherein the second action is different than the first action.

In some implementations, a non-transitory computer-readable medium storing a set of instructions includes one or more instructions that, when executed by one or more processors of a device, cause the device to: analyze a first portion of video data of an environment, wherein the video data is analyzed using a machine learning model trained to detect objects in the environment; detect an individual in the environment based on analyzing the first portion of video data; analyze, using the machine learning model, a second portion of the video data of the environment; detect that the individual is missing from the environment based on analyzing the second portion of the video data; determine a measure of confidence associated with detecting that the individual is missing from the environment; determine one or more confidence factors associated with determining the measure of confidence; modify the measure of confidence using the one or more confidence factors; selectively cause assistance to be provided to the individual or continue analyzing the video data based on whether a value of the modified measure of confidence, wherein the assistance is provided based on the modified measure of confidence being a first value, and wherein the video data is further analyzed based on the modified measure of confidence being a second value.

BRIEF DESCRIPTION OF THE DRAWINGS

FIG. 4 is a flowchart of an example process relating to providing assistance to an individual based on analyzing video data using a machine learning model.

DETAILED DESCRIPTION

Figure 1A:
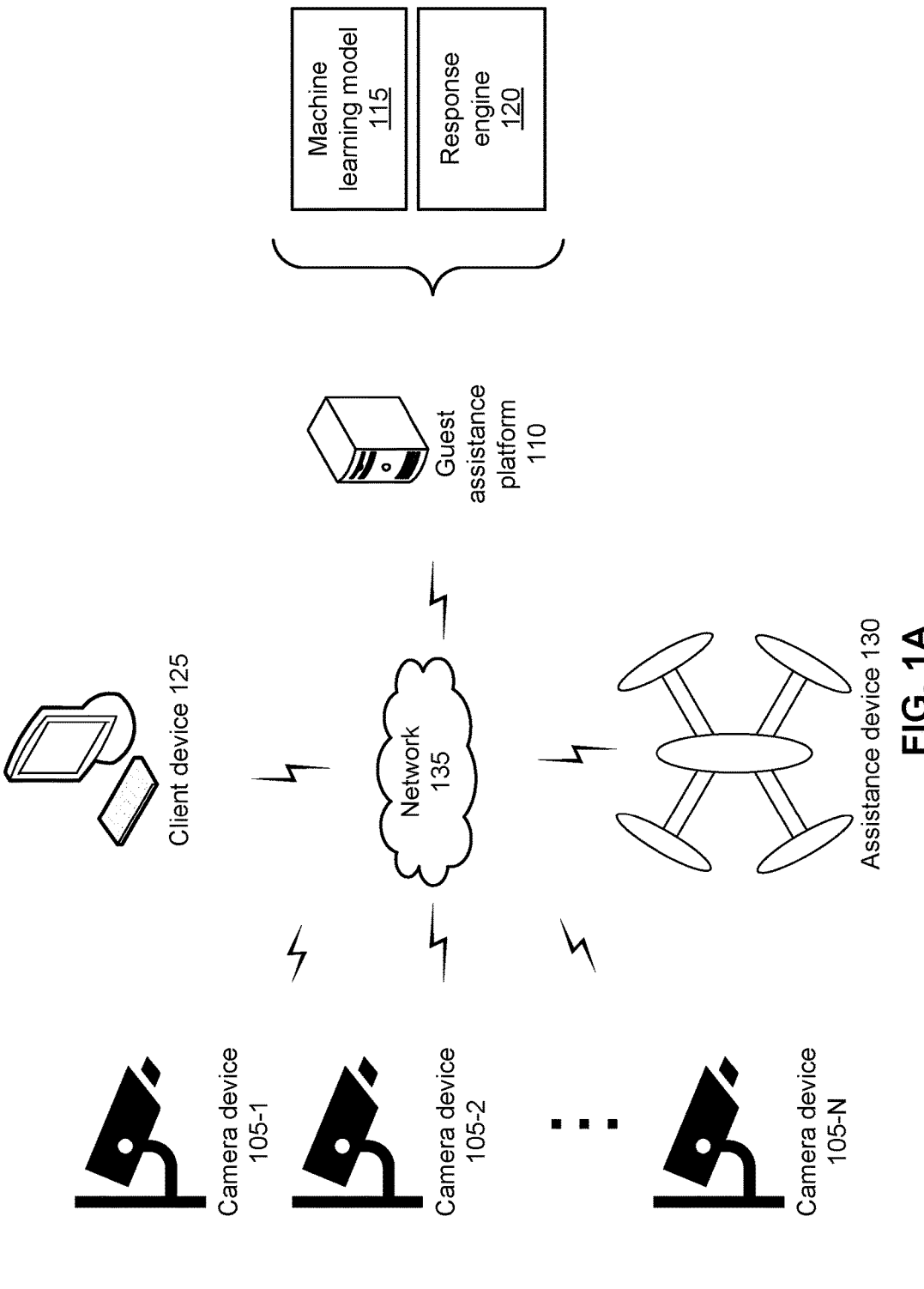
FIGS. 1A-1F are diagrams of an example implementation described herein.

The following detailed description of example implementations refers to the accompanying drawings. The same reference numbers in different drawings may identify the same or similar elements.

A CCTV system may be used to perform surveillance of areas monitored by video camera devices. The video camera devices may provide signals (e.g., video feed) to video monitors operated by an operator. The operator may monitor the video monitors to be apprised of events occurring in areas captured by the video camera devices and to determine whether assistance is to be provided to individuals in the areas.

As an example, the video camera devices may be provided in a factory that is used to manufacture liquid substances. The liquid substances may include beverages, soaps, shampoos, among other examples. The factory may include tanks that are used to manufacture the liquid items (e.g., stainless steel tanks that are used to mix the liquid items). The operator may monitor the videos monitors to be apprised of events, such as factory workers accidentally falling into the tanks.

Currently, it is challenging to simultaneously and constantly monitor the video feeds displayed by the video monitors. Typically, the operator may monitor the video feed of a first video monitor for a period of time and then monitor the video feed of a second video monitor for another period of time. While operators are quite skilled at this task, there is so much information provided in a video feed that it remains possible that some information may not be noticed or that more information may be gleaned from the video feeds than is possible with current methods.

As an example, the operator may mistake an object that has fallen into a tank as a factory worker that has fallen into the tank. In this regard, the operator may cause notifications to be provided to other factory workers (at the factory) to cause the factory workers to provide assistance to the factory worker. Additionally, the operator may transmit instructions to the tank to cause the tank to suspend operation.

Transmitting notifications and/or instructions in this manner unnecessarily consume computing resources (e.g., for generating the notifications and/or instructions), network resources (e.g., for transmitting the notifications and/or instructions), and data storage resources (e.g., for storing information identifying a state of the tank prior to suspending the operation).

As another example of the possibility that some information may not be noticed, the event may indicate that the factory worker has fallen into the tank containing the liquid substance and, accordingly, that assistance is to be provided to the factory worker (e.g., to enable the factory worker to be retrieved from the tank). The operator may be delayed in providing the desired assistance to the factory worker.

Furthermore, existing CCTV systems do not recognize an individual until a majority of (or all) body parts of the individual have been detected. Therefore, existing CCTV systems do not detect the individual if the individual is fully or partially submerged in the liquid substance. In this regard, existing CCTV systems may cause the operator to be delayed in providing the desired assistance to the factory worker. Accordingly, a need exists to improve existing CCTV systems (and/or similar video-based monitoring systems) to enable the operator to better provide assistance or other response based on information in the video.

Implementations described herein are directed to providing assistance to an individual based on analyzing video data using a machine learning model. For example, a camera device may capture video data of an environment that includes a liquid substance. As an example, the environment may be a factory that manufactures beverages and the liquid substance may be a beverage. The beverage may be contained in a tank with a depth that exceeds an average height of an individual (e.g., at least eight feet). The camera device (located inside the factory) may capture the video data as part of monitoring the environment and/or monitoring the liquid substance to detect whether an individual (e.g., a factory worker) has fallen into the liquid substance. The machine learning model may be trained to detect items in the liquid substance and classify the items as individuals or as objects. The term "individual" may be used to refer to a person, a party, a patron, a passenger, and/or a guest, among other examples.

In some implementations, a guest assistance platform may receive the video data and may analyze the video data using the machine learning model to determine whether the individual has fallen into the liquid substance. For example, the guest assistance platform may analyze the video data using one or more object recognition algorithms. In some examples, the guest assistance platform may use a keypoint detection technique, a pose estimation technique, and/or an action recognition technique to determine and classify an item in the liquid substance as an individual (needing assistance) or an object. In the example herein, the guest assistance platform is trained and/or learns to distinguish between individuals in the liquid substance or objects (e.g., belonging to the individuals) in the liquid substance. The objects may include articles of clothing, personal devices, and/or work equipment, among other examples. Based on analyzing the video data using the machine learning model, the guest assistance platform may detect that the individual has fallen into the liquid substance. The guest assistance platform may determine a measure of confidence associated with detecting that the individual has fallen into the liquid substance (e.g., a measure of confidence associated with the machine learning model detecting that the individual has fallen into the liquid substance).

The measure of confidence may be a value indicating a likelihood of the machine learning model accurately detecting that the individual has fallen into the liquid substance. In some situations, the measure of confidence may be based on a time of day (e.g., an amount of light), weather conditions, a measure of obstruction of the camera device, an amount of training data used to train the machine learning model, among other examples.

The guest assistance platform may determine one or more confidence factors associated with detecting that the individual has fallen into the liquid substance. The one or more confidence factors may be used to modify the measure of confidence to obtain a modified measure of confidence. In other words, the one or more confidence factors may increase or decrease the likelihood of the machine learning model accurately detecting that the individual has fallen into the liquid substance.

In some situations, the guest assistance platform may determine a confidence factor associated with an article of clothing of the individual, a confidence factor associated with a behavior of the individual and an environment before detecting that the individual has fallen into the liquid substance, a confidence factor associated with behaviors of additional individuals after detecting that the individual has fallen into the liquid substance, a confidence factor associated with quantities of individuals (within the distance threshold of the liquid substance) before and after detecting that the individual has fallen into the liquid substance, a confidence factor associated with audio data within the distance threshold of the liquid substance, and/or a confidence factor associated with a time of day when the individual fell into the liquid substance, among other examples.

In some implementations, confirming that an individual has been detected (in the liquid substance) may be based on one or more rules generated for the environment. In this regard, one rule may indicate that individuals reaching toward the liquid substance after detecting the individual missing from the environment is a confirmation that the individual is in the liquid substance and is in need of assistance. Another rule may indicate that 1) if the individual is present in the environment (in one video frame), 2) if the individual is absent in the environment (in a subsequent frame), then the guest assistance platform may confirm that the individual has fallen into the liquid substance and is in need of assistance. In some implementations, a human trainer may classify an item in the liquid substance as an individual (needing assistance) or as an object. Additionally, or alternatively, the item may be classified using logic that applies rules generated by the human trainer.

The guest assistance platform may perform different actions based on a value of the modified measure of confidence. For example, the guest assistance platform may continue to monitor the environment by continuing to analyze the video data if the modified measure of confidence does not satisfy a first confidence threshold. Alternatively, the guest assistance platform may cause assistance to be provided to the individual if the modified measure of confidence satisfies the first confidence threshold.

For example, the guest assistance platform may provide a notification (e.g., to a device of an operator of the factory) indicating that the individual has fallen into the liquid substance and that assistance is to be provided to the individual. Additionally, or alternatively, the guest assistance platform may cause an assistance device to be deployed toward a location of the individual (e.g., launched toward a general location of the individual). The assistance device may include a buoy, a drone, among other examples.

In some situations, the guest assistance platform may provide a notification to the device of the operator of the factory if the modified measure of confidence does not satisfy a second confidence threshold. The first confidence threshold exceeds the second confidence threshold. As an example, the notification may instruct the operator to review the video data due to the modified measure of confidence not satisfying the second confidence threshold.

Accordingly, instead of relying on an operator to monitor (continuously and simultaneously) the video monitors of a CCTV system, implementations described herein are directed to using a combination of video analysis, visual technology, non-visual technology, and other factors to determine whether an individual has fallen into a liquid substance (e.g., determine whether the individual is partially submerged or fully submerged). Implementations described herein may enable analysis of a complex scene to detect a missing individual.

Therefore, implementations described herein improve existing CCTV systems by improving a measure of accuracy associated with determining that assistance is to be provided to a guest. Accordingly, implementations described herein improve existing CCTV systems may prevent notifications and/or instructions from being erroneously transmitted due to false detection of an individual falling into a liquid substance.

In this regard, implementations described herein may preserve consume computing resources (e.g., for generating the notifications and/or instructions), network resources (e.g., for transmitting the notifications and/or instructions), and data storage resources (e.g., for storing information identifying a state of the tank prior suspending the operation) that would have been used to erroneously transmit the notifications and/or instructions. Moreover, implementations described herein detect the individual in the liquid substance independently of the requirement to detect a majority of (or all) the body parts of the individual.

While examples herein are described with respect to providing assistance to individuals (e.g., factory workers) in a factory, implementations described herein are applicable to providing assistance to individuals aboard a marine vessel that is docked at a pier. For example, implementations described herein may detect that an individual has fallen from the docked marine vessel into a body of water and may cause assistance to be provided to the individual in a timely manner. Implementations described herein are also applicable to providing assistance to individuals fallen on a ground surface (e.g., fallen on asphalt, concrete, and/or dirt, among other examples).

FIGS. 1A-1F are diagrams of an example implementation 100 described herein. Implementation 100 may be directed to providing assistance to an individual based on analyzing video data using a machine learning model. As shown in FIGS. 1A-1F, example implementation 100 includes camera devices 105-1, camera device 105-2, to camera device 105-N (collectively "camera devices 105" and individual "camera device 105"), guest assistance platform 110, client device 125, and assistance device 130.

The devices may be connected via a network 135 that includes one or more wired and/or wireless networks. For example, network 135 may include Ethernet switches. Additionally, or alternatively, network 135 may include a cellular network, a public land mobile network (PLMN), a local area network (LAN), a wide area network (WAN), a private network, the Internet, and/or a combination of these or other types of networks. Network 135 enables communication between camera devices 105, guest assistance platform 110, client device 125, and/or assistance device 130.

A camera device 105 may include one or more devices configured to capture video data of an environment. The camera device 105 may provide the video data to guest assistance platform 110. In some situations, the camera device 105 may include a microphone configured to capture audio data simultaneously with the video data being captured. In this regard, the camera device 105 may provide the audio data and/or the video data to guest assistance platform 110 for processing. Camera devices 105 are coupled by wired or wireless connections to behavior detection platform 110. Camera devices 105 may provide continuous video/audio streaming or alternatively intermittently stream based on operational needs, triggered programmatically or by motion sensors or other activity triggers.

Guest assistance platform 110 may include one or more devices configured to process video data and/or audio data to determine whether assistance is to be provided to an individual based on an analysis of video data of an environment. Processing the video data may be performed using various algorithmic techniques to condition raw video data such that objects and features in the video data are more readily analyzed by later object recognition and machine learning models. This processing may include filtering, adjusting brightness, contrast and color profiles as well as zooming, cropping, rotating and the like.

The particular processes chosen and sequence of operations will be adapted to a particular environment and capabilities of camera devices 105. For example, video from a dark environment may benefit from exposure and contrast enhancement, while video of a moving vehicle may benefit from rotational translation. In many examples algorithmic feature detection processes are also executed such as edge enhancement and detection processes, corner detection, blob detection, ridge detection and the like are used to as a part of object detection and scene analysis. Example detection techniques include Canny, Deriche, Sobel, Prewitt and/or Roberts edge detection, LoG, DoG, and DoH blob detection, Harris, Shi and Tomasi, level curve curvature corner detection, and Hough transform ridge detection.

For example, guest assistance platform 110 may analyze the video data and track an individual included in the environment based on the analysis of the video data. In some instances, guest assistance platform 110 may detect that the individual has disappeared from the environment (e.g., the individual is missing from the environment). For example, guest assistance platform 110 may detect that the individual is present the environment in one or more frames and detect that the individual is missing from the environment in one or more subsequent frames. In some situations, the environment may include a liquid substance and the individual may disappear from the environment as a result of the individual falling into the liquid substance and being fully or partially submerged.

Based on determining that the individual is missing from the environment and/or determining that the individual has fallen into the liquid substance, guest assistance platform 110 may determine that assistance is to be provided to the individual. Guest assistance platform 110 may be configured to cause assistance to be provided to the individual. As shown in FIG. 1A, guest assistance platform 110 may include a machine learning model 115 and a response engine 120. Guest assistance platform 110 may use machine learning model 115 to analyze the video data and track the individual.

For example, machine learning model 115 may be trained to detect and/or classify objects within video data or image data that identifies individuals, body parts of the individual, objects belonging to the individual, objects in the environment, among other examples. Machine learning model 115 may use raw or partially processed video or video frames as input, or may use features (edges, corners, blobs, ridges, and the like) that were identified previously. The detected body parts may include a head, a neck, shoulders, elbows, wrists, hips, knees, among other examples. The objects (e.g., belonging to the individual) may include a phone, a camera, a purse, an article of clothing, among other examples. The objects (e.g., in the environment) may include signs, doors, among other examples. Machine learning model 115 preferably takes context into account in its training and operation such that it is specifically trained to distinguish between individuals and objects in its input.

In some implementations, machine learning model 115 may implement one or more object recognition techniques. For example, machine learning model 115 may detect and/or classify features within the video image, such as body parts of individuals, objects belonging to the individuals, objects in the environment, and/or among other examples. For instance, machine learning model 115 may implement a keypoint detection technique, an action recognition technique, and/or a pose estimation technique, among other examples. Additionally, or alternatively, machine learning model 115 may implement a convolutional neural network (CNN), a Single Shot MultiBox Detector (SSD) technique, and/or a You Only Look Once (YOLO) technique, among other examples. In this regard, machine learning model 115 may be configured to determine (as the keypoints) the body parts and/or the objects mentioned herein. The keypoints may be example features that may be detected by machine learning model 115. Other features may include corners, ridges, blobs, and/or edges, among other examples. In some situations, machine learning model 115 may be a deep learning model.

Machine learning model 115 may be a machine learning model trained to determine a behavior of individuals. For example, machine learning model 115 may be trained to determine the behaviors of the individuals using the one or more object recognition techniques. For example, machine learning model 115 may determine a behavior of the individual by processing one or more image frames, of the video data, using the one or more object recognition techniques. In some examples, the behavior may be used by guest assistance platform 110 to determine whether assistance is to be provided to the individual and to provide assistance to the individual. As used herein, "behavior" may refer to and/or may be based on a set of movements performed by an individual, a set of actions performed by the individual, among other examples.

In some implementations, guest assistance platform 110 may utilize rules and logic to distinguish between individuals and objects and to determine whether assistance is to be provided to the individuals. The rules and logic may be based on the confidence factors discussed herein.

Response engine 120 may include one or more devices configured to provide recommendations and/or perform an action based on whether an individual has been detected in the liquid substance. In some implementations, response engine 120 may include the rules and logic to classify individuals and objects.

Assistance device 130 may include one or more devices configured to provide assistance to an individual. As shown in FIG. 1A, assistance device 130 may be an unmanned aerial vehicle, such as an aerial drone. Alternatively, assistance device 130 may be a buoy.

Figure 1B:
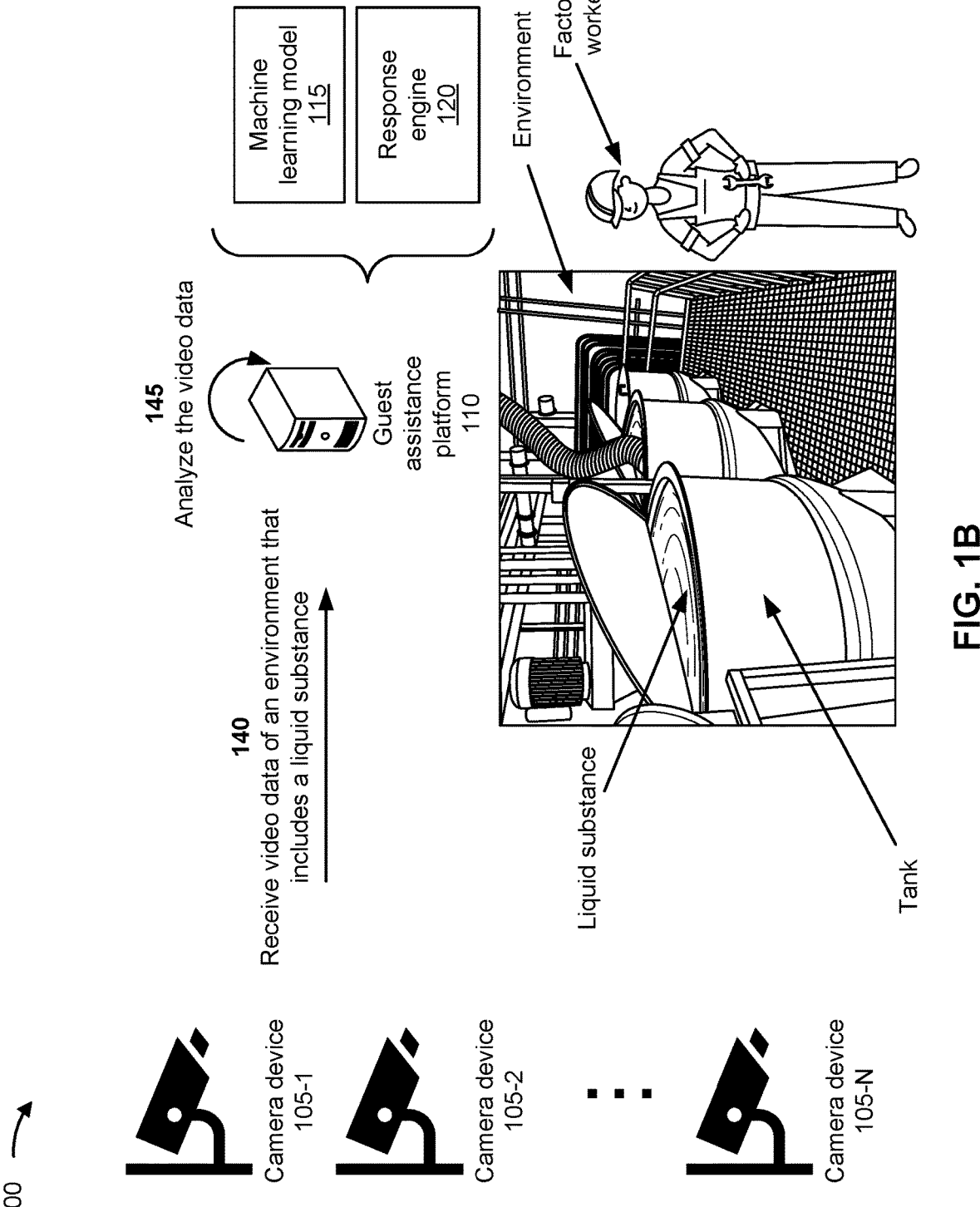

As further shown in FIG. 1B, and by reference number 140, guest assistance platform 110 may receive video data of an environment that includes a liquid substance. For example, guest assistance platform 110 may receive the video data from a camera device 105 (e.g., camera device 105-1). In some examples, guest assistance platform 110 may receive the video data as a continuous video feed. Additionally, or alternatively, user assistance platform 110 may receive the video data periodically (e.g., every second, every ten seconds, every thirty seconds, among other examples). Additionally, or alternatively, user assistance platform 110 may receive the video data based on a trigger (e.g., based on a request provided by user assistance platform 110 to camera device 105-1 and/or or based upon a sensor indicating proximity of an individual or other environmental condition that warrants collecting video data).

As shown in FIG. 1B, as an example, the environment may include a factory that manufactures a liquid substance (e.g., a beverage). Alternatively, the liquid substance may be distilled water, soap, and/or shampoo, among other examples. The factory may include tanks that are used to manufacture the liquid substance. The factory may further include factory workers that supervise manufacturing of the liquid substance. In some situations, the factory workers may inspect the tanks, and/or test the liquid substance, among other examples. An operator may monitor videos monitors to be apprised of events, such as factory workers accidentally falling into the tanks. Additionally, or alternatively to receiving the video data, guest assistance platform 110 may receive audio data associated with the video data. Guest assistance platform 110 may receive the audio data via a microphone integrated with camera device 105-1. Additionally, or alternatively, guest assistance platform 110 may receive the audio data via a microphone provided at the establishment separate from camera device 105-1

As further shown in FIG. 1B, and by reference number 145, guest assistance platform 110 may analyze the video data. Guest assistance platform 110 may analyze the video data to monitor the environment. For example, based on receiving the video data of the environment, guest assistance platform 110 may analyze a set of frames (or a portion) of the video data using machine learning model 115. For example, the video data may be provided to machine learning model 115 as an input and machine learning model 115 may provide, as an output, information identifying objects detected in the video data.

In some examples, guest assistance platform 110 may analyze the video data using the one or more object recognition techniques (e.g., implemented by using machine learning model 115). Accordingly, based on analyzing the video data using the one or more object recognition techniques, guest assistance platform 110 may detect factory workers located within a distance threshold of a tank and may track the detected factory workers. Guest assistance platform 110 may track a height of each factory worker, a body type of each factory worker, a hair style of each factory worker, a hair color of each factory worker, and/or one or more articles of clothing of each factory worker, among other examples. Guest assistance platform 110 may track a factory worker without determining an identity of the factory worker.

In some examples, when tracking the factory workers, guest assistance platform 110 may use machine learning model 115 to determine behaviors of the factory workers. For example, machine learning model 115 may use the keypoint technique and/or the action recognition technique to determine the behaviors of the factory workers. In some implementations, machine learning model 115 may detect keypoints of the factory workers using the keypoint technique. For instance, machine learning model 115 may analyze a set of frames of the video data to detect keypoints (of the individual) in each frame of the video frame.

Guest assistance platform 110 may determine the behaviors using the action detection technique. For instance, guest assistance platform 110 may determine the behaviors based on the keypoints (of the guest) over a plurality of frames of the video data. For instance, guest assistance platform 110 may analyze the keypoints, using the action detection technique, to determine the action and, accordingly, the behaviors. Additionally, or alternatively, guest assistance platform 110 may analyze the pose and/or the orientation over multiple frames of the video data, using the action recognition technique, to determine the action and, accordingly, the behaviors.

With respect to determining the behaviors, guest assistance platform 110 may determine (e.g., using machine learning model 115) that the factory workers are inspecting the tank (e.g., an inside surface of the tank and/or an outside surface of the tank). Additionally, or alternatively, machine learning model 115 may determine that the factory workers are inspecting a lid of the tank. Additionally, or alternatively, machine learning model 115 may determine that the factory workers are performing a test of the liquid substance to determine characteristics of the liquid substance (e.g., to determine a measure of consistency, to determine an aroma/scent, and/or to determine a taste, among other examples).

As shown in FIG. 1B, based on analyzing the video data, guest assistance platform 110 may determine that a factory worker is inspecting the tank. Additionally, based on analyzing the video data, guest assistance platform 110 may detect an article of clothing (e.g., a hard hat) and a tool of the factory worker, a height of the factory worker, a body type of the factory worker, a hair style of the factory worker, and/or a hair color of the factory worker, among other examples.

The behaviors can be thought of as an understanding of the determined actions in context of the environment. The context can be determined from scene analysis, or often more readily by knowing information regarding the camera device 105 such as camera location. For example, based on the camera device 105 being located in the factory, an individual moving around the tank may be indicative of the individual inspecting the tank or performing a test of the content of the tank. In this manner, guest assistance platform 110 operates to derive meaning from the actions to reveal the behaviors.

Figure 1C:
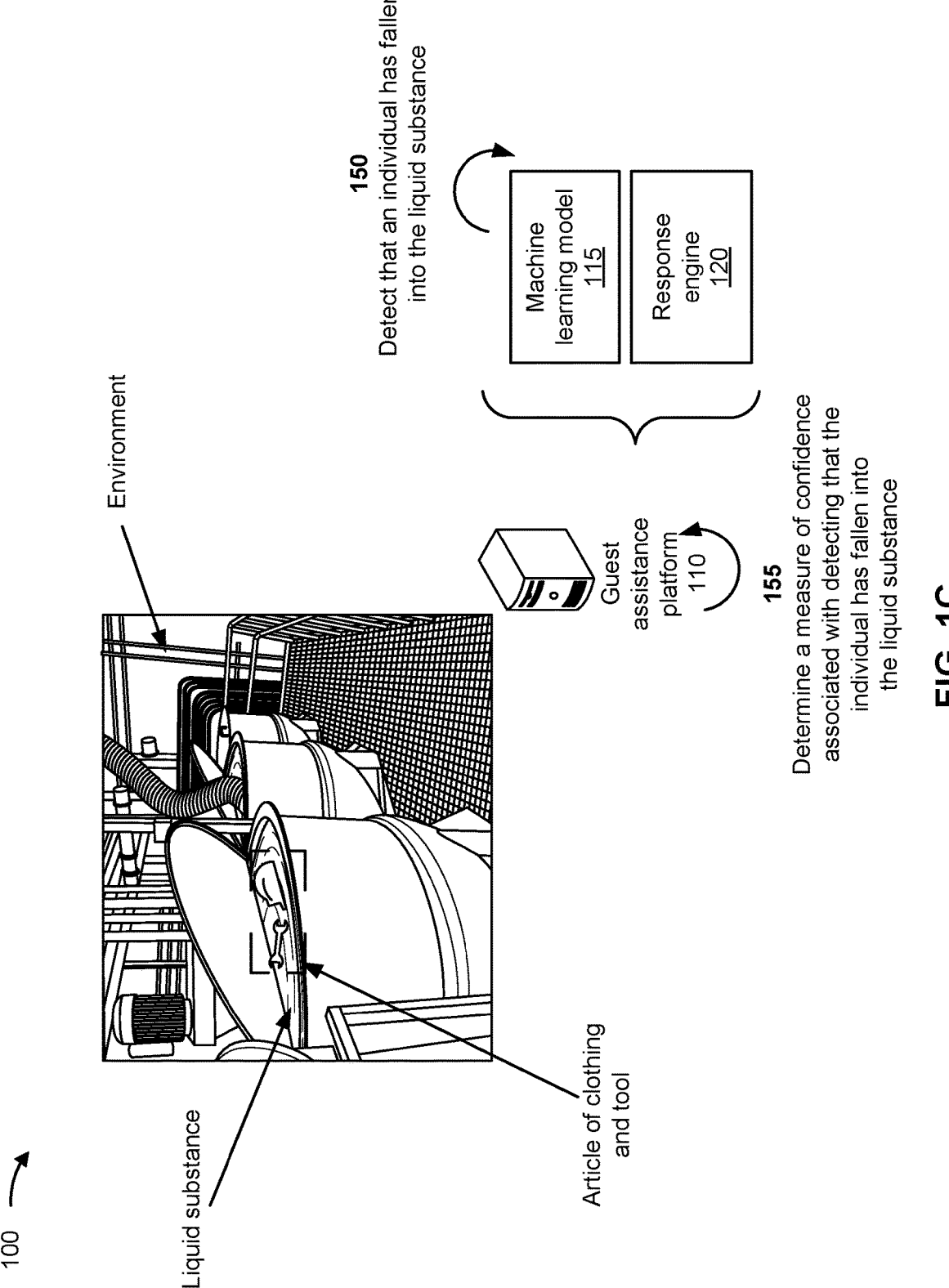

As further shown in FIG. 1C, and by reference number 150, guest assistance platform 110 may detect that an individual has fallen into the liquid substance. For example, as machine learning model 115 continues to analyze the video data, machine learning model 115 may detect that a factory worker, of the factory workers detected in the video data, is missing from the environment. For instance, based on analyzing one or more additional sets of frames (of the video data), machine learning model 115 may determine that the factory worker has disappeared from the environment.

In some situations, based on analyzing the video data, machine learning model 115 may detect that an object has fallen into the liquid substance. Machine learning model 115 may determine that the object is the factory worker for one or more reasons. For example, machine learning model 115 may determine that the factory worker has fallen into the liquid substance based on determining that the factory worker was within the distance threshold of the tank prior to detecting that the object has fallen into the liquid substance. Additionally, or alternatively, machine learning model 115 may determine that the factory worker has fallen into the liquid substance based on determining that the factory worker, previously included in the environment, is now missing from the environment. Additionally, or alternatively, machine learning model 115 may detect an article of clothing of the factory worker in the liquid substance after detecting that the object has fallen into the substance. Accordingly, machine learning model 115 may determine that the factory worker has fallen into the liquid substance.

As shown in FIG. 1C, guest assistance platform 110 may determine that the factory worker was present in the environment in one or more frames of the video data, determine that the factory worker is no longer present in the environment in one or more subsequent frames of the video data, and detect the article of clothing and the tool of the factory worker in the one or more subsequent frames. Accordingly, guest assistance platform 110 may determine that the factory worker has fallen into the tank that the factory worker was inspecting.

As further shown in FIG. 1C, and by reference number 155, guest assistance platform 110 may determine a measure of confidence associated with detecting that the individual has fallen into the liquid substance. In some implementations, machine learning model 115 may generate, as an output, a measure of confidence associated with detecting the individual is missing from the environment. For example, machine learning model 115 may generate, as an output, the measure of confidence associated with detecting that the individual has fallen into the liquid substance. Guest assistance platform 110 may determine the measure of confidence based on the output of machine learning model 115.

The measure of confidence may be a value indicating a likelihood of machine learning model 115 accurately detecting that the factory worker has fallen into the liquid substance. The measure of confidence may be a value indicating a measure of accuracy with respect to machine learning model 115 detecting that the factory worker has fallen into the liquid substance.

The measure of confidence may be generated based on one or more considerations. For example, the measure of confidence may be generated based on a time of day (e.g., dawn, morning, afternoon, evening, dusk, and/or night) when machine learning model 115 detected objects. For example, the amount of light may affect the ability of machine learning model 115 to detect objects and the amount of light may vary based on the time of day. Accordingly, the time of day may affect the ability of machine learning model 115 to detect objects. For example, the ability of machine learning model 115 to detect objects in the afternoon may exceed the ability of machine learning model 115 to detect objects in the evening. In this regard, the measure of confidence in the afternoon may exceed the measure of confidence in the evening.

Additionally, or alternatively, the measure of confidence may be generated based on a velocity of fall of the object. For example, the velocity of fall of the object may affect the ability of machine learning model 115 to detect the object. For instance, the ability of machine learning model 115 to detect objects falling at a first velocity may exceed the ability of machine learning model 115 to detect objects falling at a second velocity that exceeds the first velocity. In this regard, the measure of confidence for the first velocity may exceed the measure of confidence for the second velocity.

For example, the measure of confidence may be generated based on a time of day (e.g., dawn, morning, afternoon, evening, dusk, and/or night) when machine learning model 115 detected objects. For example, the amount of light may affect the ability of machine learning model 115 to detect objects and the amount of light may vary based on the time of day. Accordingly, the time of day may affect the ability of machine learning model 115 to detect objects. For example, the ability of machine learning model 115 to detect objects in the afternoon may exceed the ability of machine learning model 115 to detect objects in the evening. In this regard, the measure of confidence in the afternoon may exceed the measure of confidence in the evening.

Additionally, or alternatively, the measure of confidence may be generated based on weather conditions (e.g., cloudy, sunny, rain, snow, and/or hail) when machine learning model 115 detected objects. For example, the amount of light to detect objects during a sunny day may exceed the ability of machine learning model 115 to detect objects during a cloudy day. In this regard, the measure of confidence during a sunny day may exceed the measure of confidence during a cloudy day.

Additionally, or alternatively, the measure of confidence may be generated based on a measure of obstruction of machine learning model 115. For example, the ability of machine learning model 115 to detect objects when camera device 105-1 is partially covered may exceed the ability of machine learning model 115 to detect objects when camera device 105-1 is fully covered.

Additionally, or alternatively, the measure of confidence may be generated based on an amount of training data used to train machine learning model 115. For example, the ability of machine learning model 115 to detect objects may increase as the amount of training data increases. Accordingly, the measure of confidence may increase as the amount of training data increases.

Figure 1D:
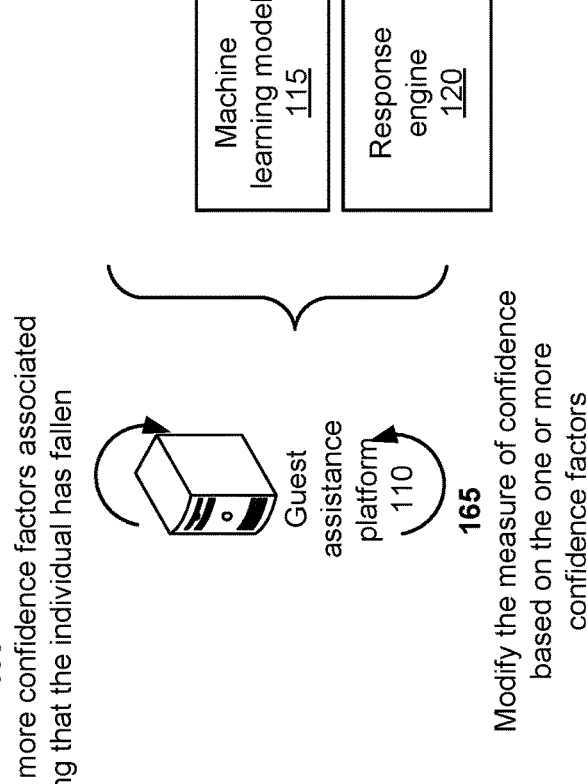

As shown in FIG. 1D, and by reference number 160, guest assistance platform 110 may determine one or more confidence factors associated with detecting that the individual has fallen into the liquid substance. The one or more confidence factors may be values that are used to modify the measure of confidence. The one or more confidence factors may include a confidence factor based on items belonging to the individual The items may include articles of clothing, a cellular phone, a tablet, a notebook, among other examples.

The one or more confidence factors may further include a confidence factor based on quantities of individuals before and after detecting that the individual has fallen into the liquid substance. For example, the confidence factor may be based on a difference between a first quantity of individuals within the distance threshold of the liquid substance and a second quantity of individuals within the distance threshold of the liquid substance.

The one or more confidence factors may further include a confidence factor based on a behavior of the individual prior to machine learning model 115 detecting that the individual has fallen into the liquid substance. Guest assistance platform 110 may use machine learning model 115 to determine the behavior of the factory worker. Alternatively, machine learning model 115 may use an additional machine learning model to determine the behavior of the factory worker. Guest assistance platform 110 may analyze the behavior of the factory worker to determine whether the behavior is a behavior that may have caused the factory worker to fall into the liquid substance. For example, machine learning model 115 may determine whether the factory worker was inspecting the tank (e.g., inside surface of the tank). Additionally, or alternatively, machine learning model 115 may determine that the factory worker was inspecting a lid of the tank. Additionally, or alternatively, machine learning model 115 may determine that the factory worker was performing a test of the liquid substance to determine characteristics of the liquid substance (e.g., to determine a measure of consistency, to determine an aroma/scent, and/or to determine a taste, among other examples).

The one or more confidence factors may further include a confidence factor that is based on behaviors of one or more additional individuals after detecting that the individual has fallen into the liquid substance. The one or more additional individuals may include remaining one or more factory workers of the factory workers detected in the video data. The behaviors of the one or more additional individuals may be determined using machine learning model 115 and/or an additional machine learning model. Machine learning model 115 may determine whether the behaviors of the remaining one or more factory workers are behaviors that indicate that the one or more remaining one or more factory workers are aware that the factory worker has fallen into the liquid substance and/or indicate that the remaining one or more factory workers are attempting to provide assistance to the factory worker.

The one or more confidence factors may further include a confidence factor that is based on body parts of the factory worker protruding from the liquid substance. Guest assistance platform 110 may use machine learning model 115 to determine whether body parts of the factory worker are protruding out of the liquid substance and/or whether an item (belonging to the factory worker) has been detected on the surface of the liquid substance.

The one or more confidence factors may further include a confidence factor that is based on a time of day. For example, factory workers may typically be located within the distance threshold during a first period of time. Alternatively, factory workers may not typically be located within the distance threshold during a second period of time.

The one or more confidence factors may further include a confidence factor that is based on audio data obtained with the video data. The audio data may indicate that an object has fallen into the liquid substance (e.g., the audio data may correspond to a splashing sound). Additionally, or alternatively, the audio data may indicate a muffled utterance for assistance (e.g., uttered by the factory worker). Additionally, or alternatively, the audio data may indicate an utterance for assistance (e.g., the one or more additional factory workers).

In some situations, the one or more confidence factors may be associated with different weights. For example, a weight of the confidence factor that is based on the behavior of the individual may exceed a weight of the confidence factor that is based on the time of day.

As shown in FIG. 1D, and by reference number 165, guest assistance platform 110 may modify the measure of confidence based on the one or more confidence factors. For example, guest assistance platform 110 may increase the measure of confidence based on a first confidence factor and/or decrease the measure of confidence based on a second confidence factor. Guest assistance platform 110 may be modified the measure of confidence to obtain a modified measure of confidence.

In some instances, guest assistance platform 110 may increase the measure of confidence if the second quantity of individuals (prior to detecting that the individual has fallen) exceeds the first quantity of individuals (after detecting that the individual has fallen). Additionally, or alternatively, guest assistance platform 110 may increase the measure of confidence if the behavior of the individual (prior to machine learning model 115 detecting that the individual has fallen into the liquid substance) is a behavior that may have caused the factory worker to fall into the liquid substance (e.g., testing the liquid substance or inspecting the tank).

Additionally, or alternatively, guest assistance platform 110 may increase the measure of confidence if the behaviors of the remaining one or more factory workers indicate that the one or more remaining one or more factory workers are aware that the factory worker has fallen into the liquid substance and/or indicate that the remaining one or more factory workers are attempting to provide assistance to the factory worker. Additionally, or alternatively, guest assistance platform 110 may increase the measure of confidence if machine learning model 115 detects that body parts of the factory worker are protruding out of the liquid substance and/or if machine learning model 115 detects an item (belonging to the factory worker) on the surface of the liquid substance.

Additionally, or alternatively, guest assistance platform 110 may increase the measure of confidence if the time of day is the first period of time, as explained herein. Additionally, or alternatively, guest assistance platform 110 may increase the measure of confidence if the audio data indicates that the object has fallen into the liquid substance, indicates a muffled utterance for assistance (e.g., by the factory worker), indicate an utterance for assistance (e.g., by the one or more additional factory workers), among other examples.

Figure 1E:
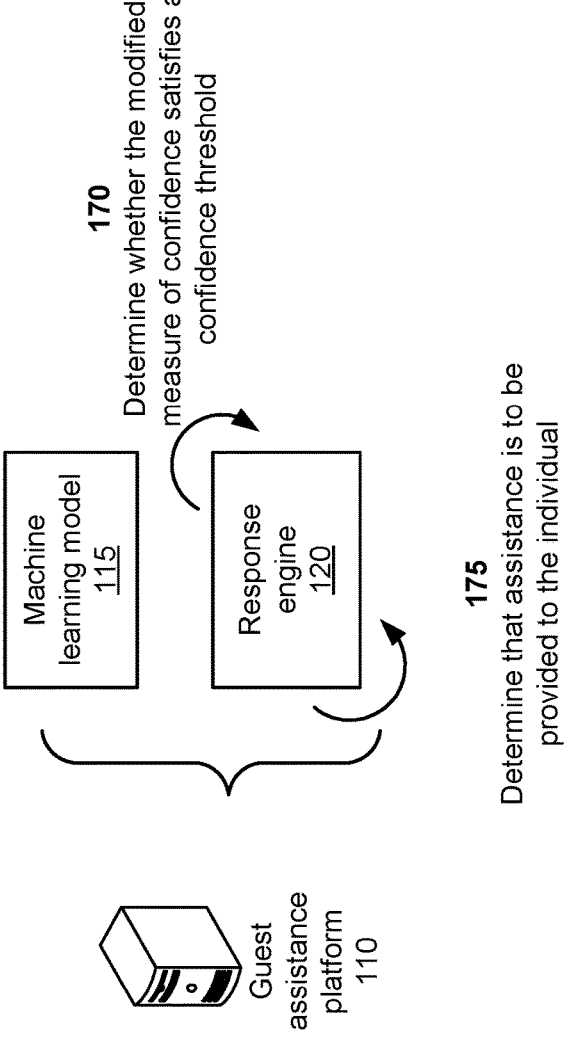

As shown in FIG. 1E, and by reference number 170, guest assistance platform 110 may determine whether the modified measure of confidence satisfies a confidence threshold. For example, guest assistance platform 110 may compare the modified measure of confidence to one or more confidence thresholds. The one or more confidence thresholds may be determined by the operator of the factory, by an operator associated with guest assistance platform 110, among other examples.

As shown in FIG. 1E, and by reference number 175, guest assistance platform 110 may determine that assistance is to be provided to the individual based on whether the modified measure of confidence satisfies the confidence threshold. For example, if the modified measure of confidence satisfies a first confidence threshold, guest assistance platform 110 may determine that assistance is to be provided to the individual. Alternatively, if the modified measure of confidence does not satisfy the first confidence threshold, guest assistance platform 110 may determine that no assistance is to be provided.

In some situations, if the modified measure of confidence does not satisfy a second confidence threshold, guest assistance platform 110 may provide a notification to client device 125. The notification may indicate that guest assistance platform 110 has detected that the individual has fallen into the liquid substance. Additionally, the notification may provide an instruction to confirm that no assistance is to be provided to the individual. Based on the foregoing, guest assistance platform 110 may cause different actions to be performed based on different values of the modified measure of confidence.

For example, guest assistance platform 110 may cause a first action to be performed based on a first value of the modified measure of confidence, cause a second action to be performed based on a second value of the modified measure of confidence, cause a third action to be performed based on a third value of the modified measure of confidence, and so on. For instance, the first action may include providing the notification, the second action may include deploying an aerial drone to the location of the individual, the third action may include deploying a buoy to the location of the individual, and so on.

In some examples, the second value may exceed the first value, the third value may exceed the second value, and so on. Additionally, or alternatively, the value of the modified measure of confidence may increase to indicate a measure of urgency associated with providing assistance to the individual.

The type of assistance and the manner in which it is called for can be escalated based on the context of the environment known to guest assistance platform 110. In some examples, the content of the environment may include a temperature of the liquid substance, a depth of the tank, content of the liquid substance, among other examples. For instance, the type of assistance and the manner in which it is called for can be escalated as the temperature increases, as the depth increases, among other examples. In some situations, a decision tree or cyclic graph decision process can be implemented by guest assistance platform 110 to select appropriate assistance in a given context, be it notifying a human assistant, turning on lights, turning off or removing power from a mechanism (e.g., of the tank), draining the tank, and the like.

Figure 1F:
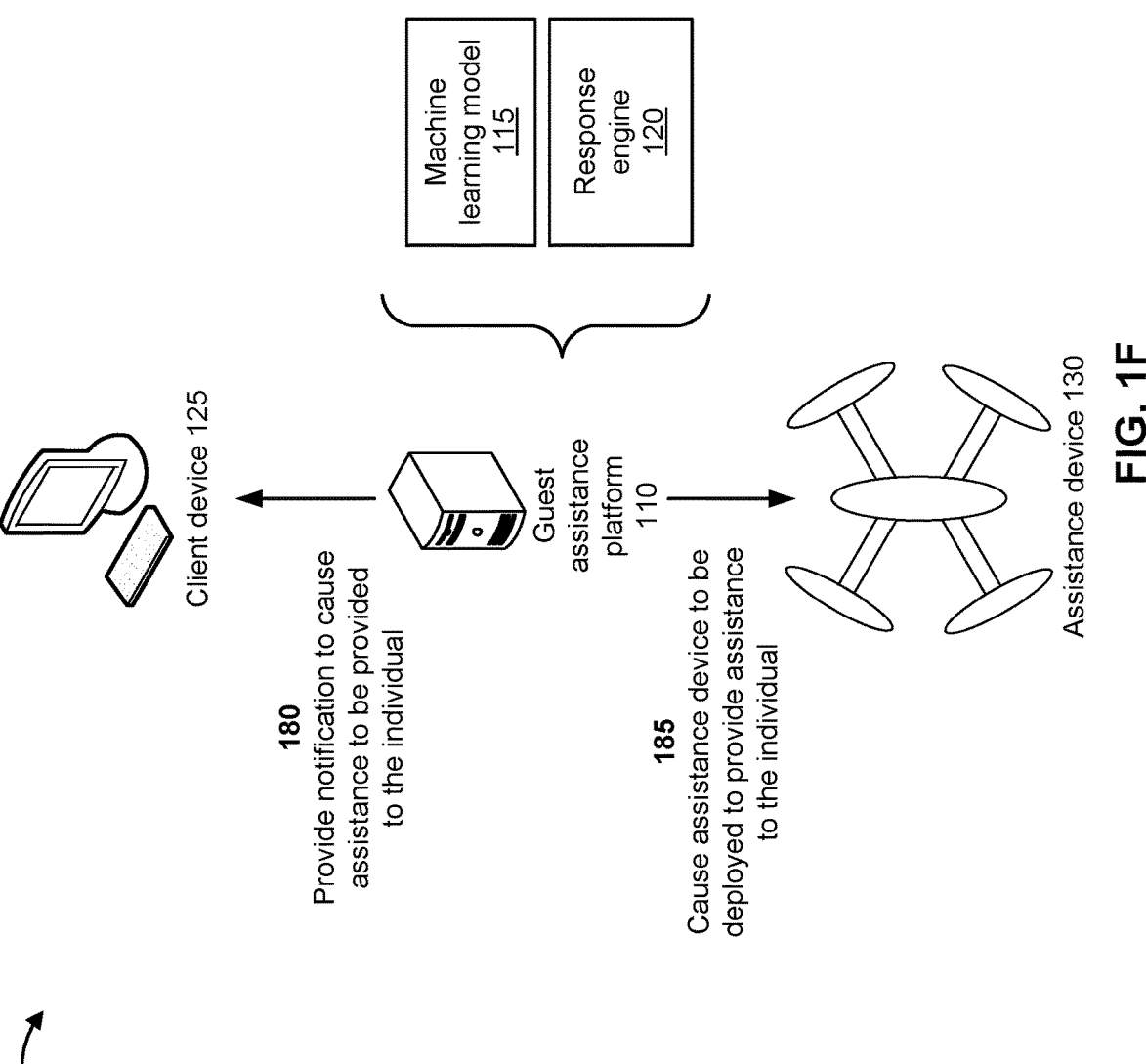

As shown in FIG. 1F, and by reference number 180, guest assistance platform 110 may provide a notification to cause assistance to be provided to the individual. For example, if the modified measure of confidence satisfies the first confidence threshold, guest assistance platform 110 (e.g., response engine 120) may provide a notification to cause assistance to be provided to the individual.

As an example, the notification include location information identifying a location of the factory worker. For example, the location information may include geographical coordinates of the factory worker, information identifying the tank, geographical coordinates of the tank, among other examples. The notification may indicate that guest assistance platform 110 has detected that the individual has fallen into the liquid substance and that assistance is to be provided to the factory worker.

As shown in FIG. 1F, and by reference number 185, guest assistance platform 110 may cause assistance device to be deployed to provide assistance to the individual. For example, if the modified measure of confidence satisfies the first confidence threshold, guest assistance platform 110 (e.g., response engine 120) may provide instructions to assistance device 130. The instructions may include the location information, and/or directions to the location, among other examples. In some examples, guest assistance platform 110 (e.g., response engine 120) may cause assistance device 130 to be deployed if the modified measure of confidence exceeds the modified measure of confidence associated with providing the notification to client device 125.

Implementations described herein improve a response time to an individual falling into a liquid substance and improve a probability of the individual receiving assistance in a timely manner. Using video analysis and the combination of other technology/algorithms, the environment and/or the liquid substance may be continuously and effectively monitored to detect an individual in the liquid water. Implementations described herein allow a custom confidence level for object detection so that actions are taken (to provide assistance to the individual) when the measure of confidence indicates a likelihood that a detected object could be an individual.

Accordingly, implementations described herein may preserve consume computing resources (e.g., for analyzing the video and for generating the notifications and/or instructions), network resources (e.g., for transmitting the notifications and/or instructions), and data storage resources (e.g., for storing information identifying a state of the tank prior suspending the operation) that would been used to erroneously transmit the notifications and/or instructions. Moreover, implementations described herein detect the individual in the liquid substance independently of the requirement to detect a majority of (or all) the body parts of the individual. While examples herein are described with respect to providing assistance to individuals (e.g., human beings), implementations described herein are applicable to providing assistance to animals.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
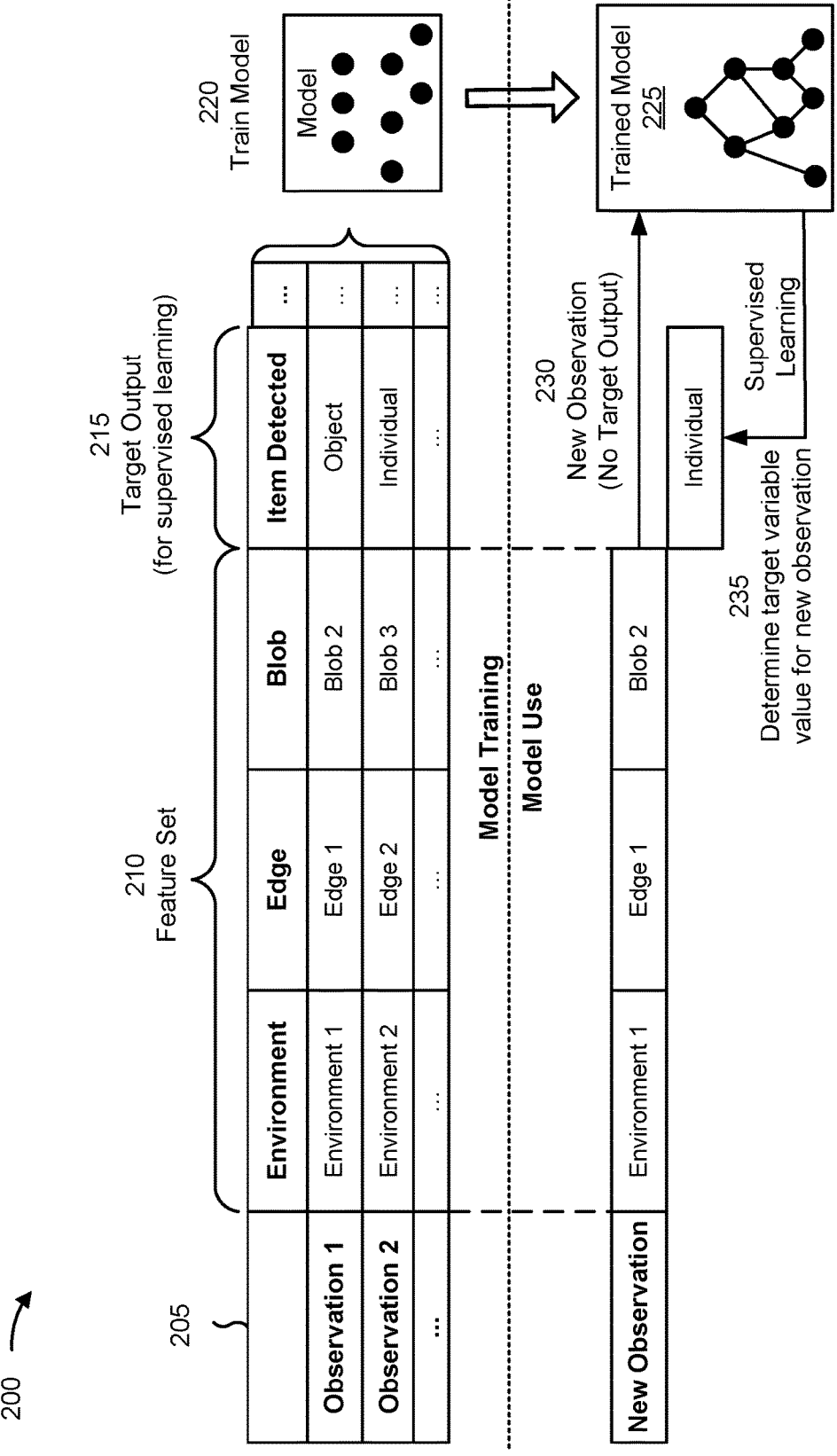
FIG. 2 is a diagram of an example environment in which systems and/or methods described herein may be implemented.

FIG. 2 is a diagram illustrating an example 200 of training and using a machine learning model in connection with determining whether assistance is to be provided to an individual based on machine learning analysis of video data. The machine learning model training and usage described herein may be performed using a machine learning system. The machine learning system may include or may be included in a computing device, a server, a cloud computing environment, or the like, such as the camera devices 105, guest assistance platform 110, and/or camera device 105-1.

As shown by reference number 205, a machine learning model may be trained using a set of observations. The set of observations may be obtained from training data (e.g., historical data), such as data gathered during one or more processes. In some implementations, the machine learning system may receive the set of observations (e.g., as input) from camera devices 105.

As shown by reference number 210, the set of observations may include a feature set. The feature set may include a set of values, and a value may be referred to as a feature. A specific observation may include a set of values. In some implementations, the machine learning system may determine values for a set of observations and/or values for a specific observation based on input received from camera devices 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature set of environment, a second feature set of edge, a third feature set of blob, and so on. As shown, for a first observation, the first feature set is labeled Environment 1, the second feature set is labeled Edge 1, the third feature set is labeled Blob 2, and so on. These features sets are provided as examples, and may differ in other examples. Feature set "Environment 1" contains data representing features extracted from Observation 1 that pertain to the physical environment represented in the observation, e.g., walls, aisles, floors, objects (e.g., tanks), and the like that are present in addition to an individual. The Environment 1 feature set will be used as input to an observed scene. Feature set "Edge 1" contains data representing features extracted from Observation 1 that pertain to the edges of body parts of the individual, objects in the individual's possession (e.g., articles of clothing, devices, tools), and/or objects in the environment. Feature set "Blob 2" contains data representing features extracted from Observation 1 that pertain to the blobs regarding the body parts of the individual, the objects in the individual's possession, and/or the objects in the environment. For example, the feature set may include one or more of the following features: corners, ridges, keypoints, location, time of the day, articles of clothing, number of individuals before and after detecting that the individual has fallen into a liquid substance, behaviors of the individuals after detecting that the individual has fallen into a liquid substance, among other examples.

As shown by reference number 215, the set of observations may be associated with a target output. The target output may be represented by a numeric value, may represent a numeric value that falls within a range of values or has some discrete possible values, may represent a value that is selectable from one of multiple options (e.g., one of multiples classes, classifications, or labels) and/or may represent a Boolean value. A target output may be specific to an observation. In example 200, the target output is Item Detected, which has a value of "Object" for the first observation. In other words, the first observation may indicate that the object (not an individual) has been detected in the liquid substance. Accordingly, the machine learning model may be trained, based on the feature set, to classify the observation as items detected (e.g., individuals or objects).

The target output may represent an output that a machine learning model is being trained to predict, and the feature sets may represent the inputs used to a train a machine learning model. The set of observations may be associated with target output values so that the machine learning model can be trained to recognize patterns in the feature set that lead to a target output. A machine learning model that is trained to predict a target output value may be referred to as a supervised learning model.

In some implementations, the machine learning model may be trained on a set of observations that do not include a target output. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the feature sets 210 extracted from the observations 205 and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, once trained, the machine learning system may apply the trained machine learning model 225 to a new observation, such as by receiving a new observation and inputting the new observation to the trained machine learning model 225. As shown, the new observation may include a first feature set of Environment 1, a second feature set of Edge 1, a third feature set of Blob 2, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target output, such as when supervised learning is employed. Additionally, or alternatively, the output may include information that identifies a cluster to which the new observation belongs (e.g., does the new observation belong to a cluster labeled "confirmed detected individual" or "unconfirmed detected individual"), such as when unsupervised learning is employed.

As an example, the trained machine learning model 225 may predict a value of "Individual" for the target variable of Item Detected for the new observation, as shown by reference number 235. Based on this prediction, response engine 120 may determine whether assistance is to be provided to the individual. For example, response engine 120 may classify the object as an individual or an object and may cause assistance to be provided to the individual. Based on determining that the object is an individual and that assistance is to be provided, response engine 120 may provide a first recommendation, may provide output for determination of a first recommendation, may perform a first automated action, and/or may cause a first automated action to be performed (e.g., by instructing another device to perform the automated action), among other examples. The first recommendation may include, for example, providing assistance to the individual. The first automated action may include, for example, providing a notification to the device of a co-worker or provide a notification to the device of an operator.

In this way, the guest assistance platform 110 may apply a rigorous and automated process to provide a response to objects that are detected. The machine learning system enables recognition and/or identification of tens, hundreds, thousands, or millions of features and/or feature values for tens, hundreds, thousands, or millions of observations, thereby increasing accuracy and consistency and reducing delay associated with responding to observable events by human operators manually directing response.

As indicated above, FIG. 2 is provided as an example.

Figure 3:
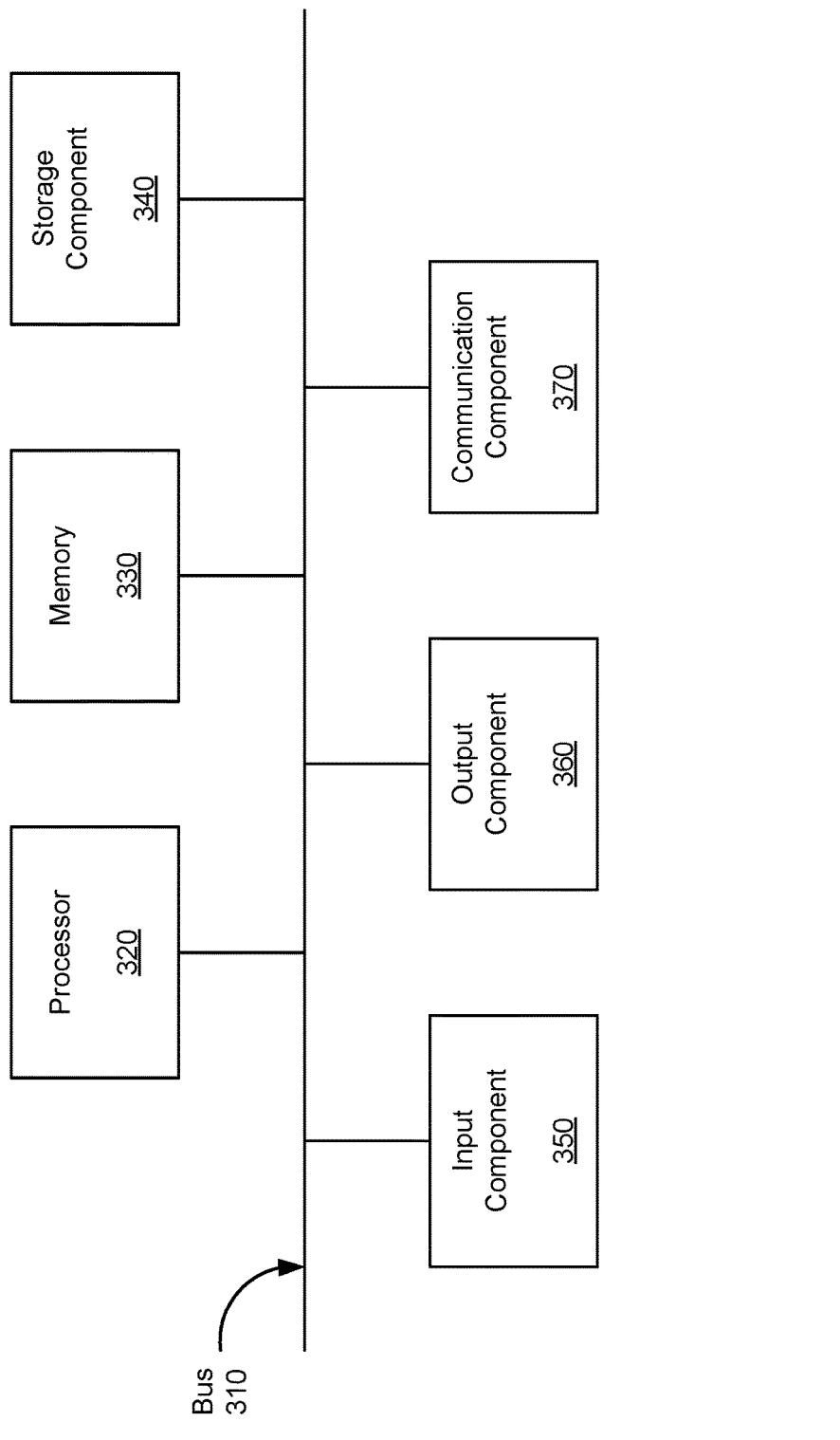
FIG. 3 is a diagram of example components of one or more devices of FIG. 2.

FIG. 3 is a diagram of example components of a device 300, which may correspond to camera devices 105, guest assistance platform 110, client device 125, and/or assistance device 130. In some implementations, camera devices 105, guest assistance platform 110, client device 125, and/or assistance device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to providing assistance to an individual based on analyzing video data using a machine learning model. In some implementations, one or more process blocks of FIG. 4 may be performed by a guest assistance platform (e.g., guest assistance platform 110). In some implementations, one or more process blocks of FIG. 4 may be performed by another device or a group of devices separate from or including the guest assistance platform, such as a camera device (e.g., camera device 105), a client device (e.g., client device 125), and/or assistance device (e.g., assistance device). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include analyzing video data of an environment that includes a liquid substance (block 410). For example, the guest assistance platform may analyze video data of an environment that includes a liquid substance. The video data is analyzed using a machine learning model trained to detect objects in the liquid substance. In some examples, the guest assistance platform may obtain continuous video/audio streaming or alternatively intermittently stream from one or more camera devices 105.

For example, the machine learning model may identify a first feature set of environments, a second feature set of edges, a third feature set of blobs, a fourth feature set of corners, a fifth feature set of ridges, a sixth feature set of keypoints, and so on. The features may be represented by values, vectors, or other data structures suitable for the machine learning model and meet the needs of the application. In some implementations, the features may be identified using one or more techniques, such as an edge detection technique, a primal sketch technique, an edge matching technique, a greyscale matching technique, a gradient matching technique, a pose consistency technique, among other examples. As an alternative, rules, algorithms and/or explicit logic may be used to determine some features either alone or in combination with the machine learning model.

some implementations, the video data may be analyzed using a keypoint detection technique to identify a plurality of keypoints of the guest. In examples, the keypoint detection technique may be based on or may include a scale-invariant feature transform algorithm, a speeded up robust features algorithm, a feature from accelerated segment test algorithm, among other examples. In some implementations, analyzing the video data to determine the keypoints comprises using a pose estimation technique to determine at least one of a pose or an orientation of the guest. The at least one of the pose or the orientation may be determined based on the plurality of keypoints identified using the keypoint detection technique.

In some implementations, analyzing the video data and the keypoints comprises using an action recognition technique to identify an action performed by the individual. The action recognition technique may include a sensor-based activity recognition technique, a Wi-Fi-based activity recognition technique, a vision-based activity recognition technique, a data-mining-based activity recognition technique, among other examples.

The action may be identified based on the features of the individual. For example, the action may be identified based on the keypoints identified using the keypoint detection technique. The actual guest behavior may be identified based on the action. In some examples, identifying the action may include analyzing data from multiple observations over a period of time.

As further shown in FIG. 4, process 400 may include detecting an individual in the liquid substance based on analyzing the video data (block 420). For example, the guest assistance platform may detect an individual in the liquid substance based on analyzing the video data.

As further shown in FIG. 4, process 400 may include determining a measure of confidence associated with detecting the individual in the liquid substance (block 430). For example, the guest assistance platform may determine a measure of confidence associated with detecting the individual in the liquid substance.

As further shown in FIG. 4, process 400 may include determining one or more confidence factors associated with detecting the individual in the liquid substance (block 440). For example, the guest assistance platform may determine one or more confidence factors associated with detecting the individual in the liquid substance.

In some implementations, analyzing the video data to determine the one or more confidence factors comprises analyzing a first set of frames, of the video data, to determine a first quantity of individuals located within a distance threshold of the liquid substance, analyzing a second set of frames, of the video data, to determine a second quantity of individuals located within the distance threshold of the liquid substance, determining a confidence factor based on a difference between the first quantity and the second quantity, and increasing the measure of confidence based on the confidence factor, wherein the measure of confidence is increased based on the first quantity exceeding the second quantity.

In some implementations, analyzing the video data to determine the one or more confidence factors comprises analyzing a set of frames, of the video data, to determine behaviors of one or more additional individuals after detecting the individual in the liquid substance, determining a confidence factor based on the behaviors, and increasing the measure of confidence based on the confidence factor, wherein the measure of confidence is increased based on the behaviors indicating that the one or more additional individuals are attempting to provide assistance to the individual.

In some implementations, analyzing the video data to determine the one or more confidence factors comprises analyzing a first set of frames, of the video data, to identify an article of clothing that is in possession of the individual prior to detecting the individual in the liquid substance, analyzing a second set of frames, of the video data, to determine that the article of clothing is located on the liquid substance, determining a confidence factor based on determine that the article of clothing is located on the liquid substance, and increasing the measure of confidence based on the confidence factor, wherein the measure of confidence is increased based on the article of clothing being located on the liquid substance.

In some implementations, process 400 includes receiving first video data, of the video data, from a first camera device, receiving second video data, of the video data, from a second camera device, analyzing the first video data to detect that the individual has fallen in the liquid substance, and analyzing the second video data to determine the one or more confidence factors.

As further shown in FIG. 4, process 400 may include modifying the measure of confidence, using the one or more confidence factors, to obtain a modified measure of confidence (block 450). For example, the guest assistance platform may modify the measure of confidence, using the one or more confidence factors, to obtain a modified measure of confidence. For example, the guest assistance platform may increase the measure of confidence if the behaviors of one or more factory workers indicate that the one or more factory workers are attempting to provide assistance to the factory worker. For instance, the guest assistance platform may increase the measure of confidence if the behaviors of the one or more factory workers indicate that the one or more factory workers are reaching toward the liquid substance to pull the factory worker out of the liquid substance. Alternatively, the guest assistance platform may decrease the measure of confidence if the behaviors of the one or more factory workers indicate that the one or more factory workers are inspecting the tank (or performing another task) without concern for the factory worker.

Additionally, or alternatively, guest assistance platform 110 may increase the measure of confidence if the time of day is a period of time during which factory workers are performing various tasks in a vicinity of the tank. Alternatively, guest assistance platform 110 may decrease the measure of confidence if the time of day is a period of time during which factory workers are not located in a vicinity of the tank.

As further shown in FIG. 4, process 400 may include determining whether the modified measure of confidence satisfies a confidence threshold (block 460). For example, the guest assistance platform may determine whether the modified measure of confidence satisfies a confidence threshold. For example, the guest assistance platform may compare the modified measure of confidence and the confidence threshold to determine whether the modified measure of confidence satisfies the confidence threshold.

As further shown in FIG. 4, process 400 may include providing a response based on whether the modified measure of confidence satisfies the confidence threshold (block 470). For example, the guest assistance platform may selectively cause assistance to be provided to the individual or continue analyzing the video data based on whether the modified measure of confidence satisfies the confidence threshold. In some examples, the guest assistance platform may cause the assistance to be provided based on the modified measure of confidence satisfying the confidence threshold. Alternatively, the guest assistance platform may continue to analyze the video data based on the modified measure of confidence not satisfying the confidence threshold, as described above.

In some implementations, causing assistance to be provided to the individual comprises determining an estimated location of the individual in the liquid substance, and deploying an assistance device to the estimated location, wherein the assistance device is used to facilitate providing assistance to the individual, and wherein providing assistance includes rescuing the individual from the liquid substance.

In some implementations, the individual is a first individual. Causing assistance to be provided to the individual comprises providing a notification to a device of a second individual that monitors the environment. The notification indicates that assistance is to be provided to the first individual.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by one or more processors, video data of an environment that includes a liquid substance;
   detecting, by the one or more processors using a machine learning model, in a first frame of the video data, a first individual within a distance threshold from the liquid substance;
   detecting, by the one or more processors using the machine learning model, in a second frame of the video data, the first individual in the liquid substance based at least partially on analyzing the video data;
   determining, by the one or more processors, a measure of confidence indicative of a likelihood of the machine learning model accurately detecting that the first individual is in the liquid substance;

analyzing, by the one or more processors using the machine learning model, a frame of the video data to determine a behavior of one or more additional individuals;

determining, by the one or more processors, one or more confidence factors based on at least the behavior;

increasing, by the one or more processors, the measure of confidence using the one or more confidence factors to determine a modified measure of confidence, wherein the behavior indicates that the one or more additional individuals are attempting to provide assistance to the first individual;

comparing, by the one or more processors, the modified measure of confidence to a confidence threshold; and communicating assistance to be provided to the first individual to at least one of a client device or an assistance device in response to determining that the modified measure of confidence satisfies the confidence threshold.

2. The method of claim 1, wherein the video data comprises first video data from a first camera and second video data from a second camera;

wherein detecting the first individual further comprises analyzing, by the one or more processors using the machine learning model, the first video data to detect that the first individual is in the liquid substance prior to determining the measure of confidence; and wherein determining the one or more confidence factors comprises analyzing, by the one or more processors using the machine learning model, the second video data to determine the one or more confidence factors.

3. The method of claim 1, wherein determining the one or more confidence factors comprises:

analyzing, by the one or more processors using the machine learning model, the first frame of the video data to determine a first quantity of individuals located within the distance threshold of the liquid substance, the first quantity of individuals including the first individual;

analyzing, by the one or more processors using the machine learning model, the second frame of the video data to determine a second quantity of individuals located within the distance threshold of the liquid substance, the second quantity of individuals excluding the first individual;

determining, by the one or more processors, the one or more confidence factors further based on a difference between the first quantity and the second quantity; and increasing, by the one or more processors, the measure of confidence based on the one or more confidence factors to determine the modified measure of confidence, wherein the first quantity is greater than the second quantity.

4. The method of claim 1, wherein determining the one or more confidence factors comprises:

analyzing, by the one or more processors using the machine learning model, a first frame of the video data to identify an article of clothing that is in possession of the first individual prior to determining the measure of confidence;

analyzing, by the one or more processors using the machine learning model, a second frame of the video data to determine that the article of clothing is located at least partially on or in the liquid substance;

determining, by the one or more processors, the one or more confidence factors further based on determining that the article of clothing is located at least partially on or in the liquid substance; and increasing, by the one or more processors, the measure of confidence based on the one or more confidence factors to determine the modified measure of confidence.

5. The method of claim 1, further comprising providing assistance to the first individual, wherein providing assistance to the first individual comprises:

determining, by the one or more processors, an estimated location of the first individual in the liquid substance; and deploying, by the one or more processors, the assistance device to the estimated location.

6. The method of claim 1, wherein:

the client device is a device of a second individual that monitors the environment; and communicating assistance to be provided to the first individual comprises providing a notification to the client device.

7. A system, comprising:

one or more cameras to capture video data of an environment including a liquid substance; and a guest assistance platform comprising a machine learning model, a response engine, and one or more processors, configured to:

receive the video data from the one or more cameras;

analyze, using the machine learning model, the video data;

detect, using the machine learning model, that a first individual is in the liquid substance;

determine a measure of confidence indicative of a likelihood of the machine learning model accurately detecting that the first individual has fallen into the liquid substance;

analyze, using the machine learning model, a frame of the video data to determine a behavior of one or more additional individuals in response to determining the measure of confidence;

determine one or more confidence factors associated with the measure of confidence based on at least the behavior;

increase the measure of confidence, using the one or more confidence factors, to determine a modified measure of confidence, wherein the behavior indicates that the one or more additional individuals are attempting to provide assistance to the first individual;

perform, by the response engine, a first action in response to determining that the modified measure of confidence is a first value that satisfies a first confidence threshold; and perform, by the response engine, a second action different than the first action in response to determining that the modified measure of confidence is a second value different than the first value and the second value satisfies a second confidence threshold;

wherein the first action and the second action provide assistance to the first individual.

8. The system of claim 7, wherein the one or more processors are further configured to:

perform, by the response engine, a third action different than the first action and the second action in response to determining that the modified measure of confidence is a third value different than the first value and the second value and the third value satisfies a third confidence threshold, wherein the third action provides assistance to the first individual.

9. The system of claim 7, wherein the one or more processors are further configured to:

analyze, using the machine learning model, a frame of the video data to determine a behavior of the first individual prior to determining the measure of confidence;

determine the one or more confidence factors further further based on the behavior of the first individual; and increase the measure of confidence based on the one or more confidence factors.

10. The system of claim 7, wherein the one or more processors are further configured to:

analyze, using the machine learning model, a first frame of the video data to detect an article of clothing that is in possession of the first individual;

analyze, using the machine learning model, a second frame of the video data to determine that the article of clothing is located at least partially on or within the liquid substance;

determine the one or more confidence factors further based on determining that the article of clothing is located at least partially on or within the liquid substance; and increase the measure of confidence based on the one or more confidence factors to determine the modified measure of confidence.

11. The system of claim 7, wherein the one or more cameras capture audio data and the one or more processors are further configured to:

receive the audio data from the one or more cameras;

analyze, using the machine learning model, the audio data;

determine that the audio data indicates that the first individual has fallen into the liquid substance;

determine the one or more confidence factors further based on determining that the audio data indicates that the first individual has fallen into the liquid substance; and increase the measure of confidence based on the one or more confidence factors to determine the modified measure of confidence.

12. The system of claim 7, further comprising:

a client device; and an assistance device;

wherein to perform the first action, the one or more processors are configured to generate a notification to the client device to indicate that assistance is to be provided to the first individual; and to perform the second action, the one or more processors are configured to:

determine an estimated location of the first individual in the liquid substance; and deploy the assistance device to the estimated location.

13. A non-transitory computer-readable medium comprising:

one or more instructions that, when executed by one or more processors, cause the one or more processors to:

update, using training data, a machine learning model;

receive video data of an environment;

analyze, using the machine learning model, a first portion of the video data;

detect a first individual in the environment;

analyze, using the machine learning model, a second portion of the video data;

determine that the first individual is missing from the environment in the second portion of the video data;

determine a measure of confidence indicative of a likelihood of the machine learning model accurately detecting that the first individual is missing from the environment by determining at least one of conditions of the environment, obstruction in the video data, or an amount of the training data used to update the machine learning model;

analyze, using the machine learning model, a frame of the video data to determine a behavior of one or more additional individuals in response to determining the measure of confidence;

determine one or more confidence factors associated with the measure of confidence based on at least the behavior;

modify the measure of confidence using the one or more confidence factors to determine a modified measure of confidence, wherein the measure of confidence is increased in response to the behavior indicating that the one or more additional individuals are attempting to provide assistance to the first individual; and generate a notification to a client device to cause assistance to be provided to the first individual in response to determining that the modified measure of confidence satisfies a first confidence threshold.

14. The non-transitory computer-readable medium of claim 13, wherein the one or more instructions cause the one or more processors to:

analyze, using the machine learning model, audio data obtained with the video data;

determine that the audio data indicates that the first individual is missing from the environment;

determine the one or more confidence factors further based on determining that the audio data indicates that the first individual is missing from the environment; and increase the measure of confidence based on the one or more confidence factors to determine the modified measure of confidence.

15. The non-transitory computer-readable medium of claim 13, wherein the one or more instructions cause the one or more processors to:

determine a time associated with the video data;

determine the one or more confidence factors further based on the time associated with the video data; and modify the measure of confidence based on the one or more confidence factors to determine the modified measure of confidence.

16. The non-transitory computer-readable medium of claim 13, wherein the one or more instructions cause the one or more processors to:

analyze, using the machine learning model, the first portion of the video data to detect an article of clothing that is in possession of the first individual;

analyze, using the machine learning model, the second portion of the video data to determine that the article of clothing is located at least partially in the environment after detecting that the first individual is missing from the environment;

determine the one or more confidence factors further based on determining that the article of clothing is located at least partially in the environment after detecting that the first individual is missing from the environment; and increase the measure of confidence based on the one or more confidence factors to determine the modified measure of confidence.

17. The non-transitory computer-readable medium of claim 13, wherein the one or more instructions cause the one or more processors to:

determine an estimated location of the first individual in the environment; and deploy an assistance device to the estimated location.

\* \* \* \* \*